UNITED STATES PATENT OFFICE.

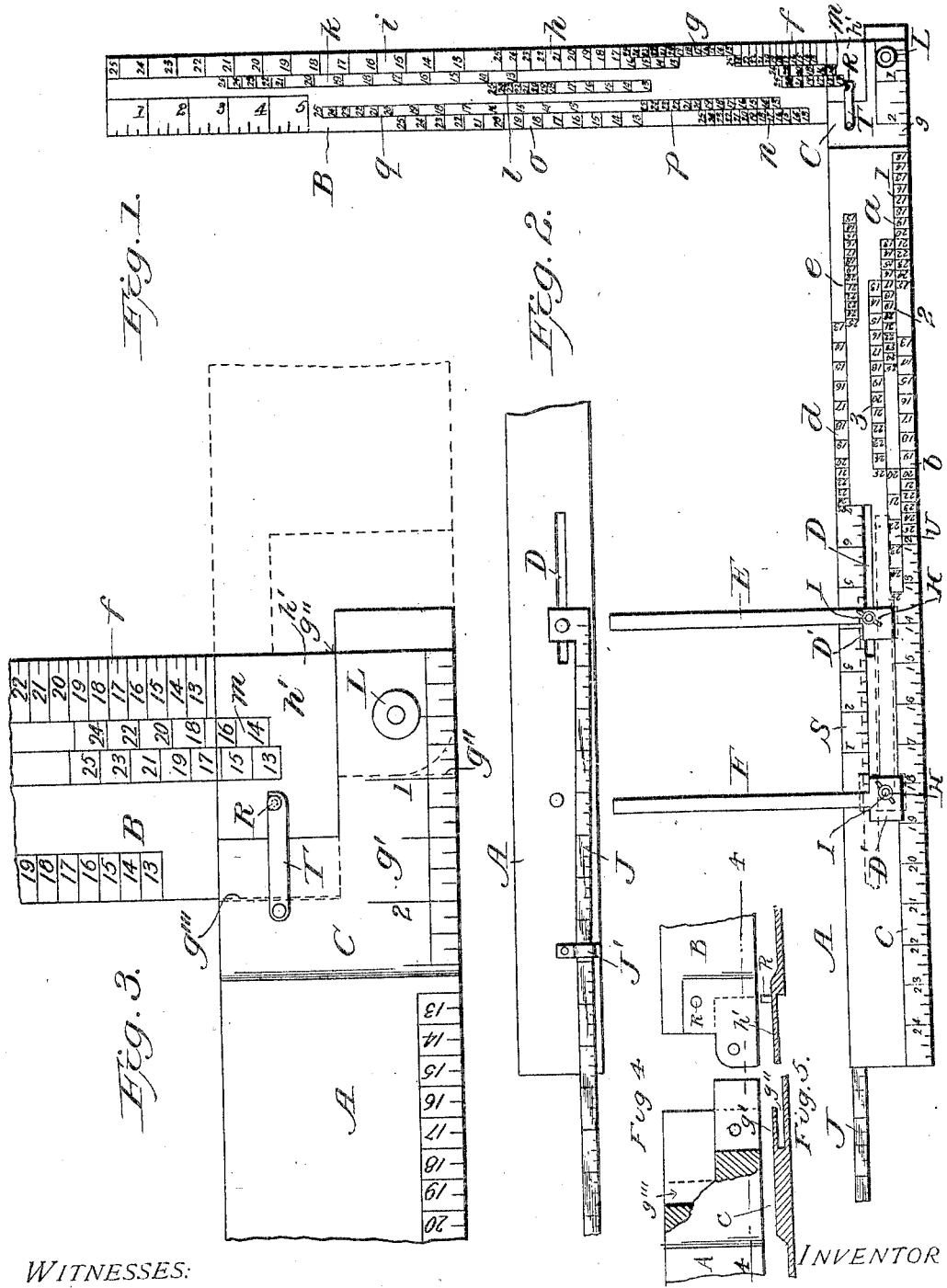

GIUSEPPE COLOSIMO, OF WASHINGTON, DISTRICT OF COLUMBIA.

TAILOR'S MEASURE OR SQUARE.

No. 797,176.　　　　Specification of Letters Patent.　　　　Patented Aug. 15, 1905.

Application filed February 11, 1905. Serial No. 245,254.

*To all whom it may concern:*

Be it known that I, GIUSEPPE COLOSIMO, a subject of the King of Italy, residing at Washington, in the District of Columbia, have invented new and useful Improvements in Tailors' Measures or Squares, of which the following is a specification.

My invention relates to what are known as tailors' "measures" or "squares," designed to provide a convenient means in the hands of tailors for taking the measurements of coats, vests, pantaloons, and similar garments.

The object of the invention is to provide a convenient and serviceable device adapted to a greater variety of uses than the squares ordinarily employed for similar purposes; and the invention consists of the parts and the constructions and arrangements of parts which I will hereinafter describe and claim.

In the accompanying drawings, forming part of this specification, and in which similar letters of reference indicate like parts in the several views, Figure 1 is a plan view of my improved device when used as a square. Fig. 2 is a plan view of a portion of one of the blades looking toward the rear or reverse side. Fig. 3 is a detail of the head or joint. Fig. 4 represents the meeting ends of the blades broken away and separated to disclose the joint or head. Fig. 5 is a sectional view on the line 4 4 of Fig. 4.

In carrying out my invention I construct the device of two blades A B and a head portion C, said head forming a joint which permits the blades to be straightened out, so that they may lie in line with one blade forming a continuation of the other, or the said blades may be made to stand one at right angles to the other, as shown in Fig. 1. Each of the blades is provided with various appropriate scales or graduations of any desired and suitable character which enable persons skilled in this art to employ these scales in drafting a pattern for use in cutting garments. The scales shown on the blades are in practice laid out with mathematical precision following the well-known rules of geometry, and they are arranged progressively along the blades and in such order and relation as to facilitate the laying out of the pattern, as I will hereinafter describe.

While the arrangement of the scales may be varied without departing from other salient features of the invention, I consider the arrangement shown as a preferred one. The head C is really formed of thickened or enlarged portions of the meeting ends of the blades, and some of the graduations are therefore marked upon the head, as shown. Along the outer edge of the blade A is marked a scale $a$, which forms one of a group of three scales 1 2 3, designed for laying out on the pattern the proper points for one-half of the back of the armhole measurement, the said scale 3 being used for sack-coats, the scale 2 for Prince Albert, cut-away, and dress coats, and the scale 1 for all other coats.

Along the outer edge of the blade A and succeeding the scale $a$ is a scale $b$ for laying out one-half of the back length of a cut-away and sack coat, and succeeding the scale $b$ and along the said outer edge of the blade A is a scale $c$ of inches and fractions thereof which will be useful for total measurement in inches.

Along the inner edge of the blade A is a scale $d$, which is resorted to when drafting the half-back length of a Prince Albert and full-dress coat, and near the beginning of said scale is a scale $e$ for use in laying out the pattern for a one-half sleeve. Succeeding the scale $d$ and along the inner edge of the blade A is also a scale S, in inches and fractions thereof, the purpose of which I will hereinafter refer to.

The blade B has along its outer edge a scale $f$ for laying out one-half of the back of neck, said scale being succeeded along said outer edge of the blade B by the scale $g$ for laying out a one-half shoulder, the scale $h$ for a one-half back, the scale $i$ for a one-half chest for a cut-away coat, sack-coat, overcoat, &c. Parallel with the scale $i$ is a similar scale $k$ for use in laying out a one-half chest for a Prince Albert and full-dress coat. There is also on the blade B the scale $l$, which is resorted to in laying out a one-half sleeve, and also on the blade, near the beginning of the scale $f$ thereof, is a scale $m$, which is used in laying out the one-half "spring" which is to be given the coat.

Along the inner edge of the blade B is a scale $n$, which is used for laying out the one-half spring for an overcoat, and farther along this inner edge of the blade B is a scale $o$ for laying out a half-front, while the outer end of the blade has the usual scale in inches and fractions thereof. Parallel with the scale $n$ is a scale $p$ for laying out a quarter-back for a coat, which scale is succeeded outwardly by a scale $q$, which represents the "dart" measure.

In each of scales referred to, as shown, the graduations are numbered from "13" to "25," these figures being only illustrative and representing one-half the minimum and maximum sizes—say in the case of a small boy and large man. Thus on these scales the numeral "13" represents one-half of the total measurement twenty-six, and "25" represents one-half of a total measure of fifty inches.

In the blade A and arranged parallel with and proximate to a scale S showing inches and fractions thereof is made a slot D. In this slot is slidably mounted the head D' or one end of a bar E, which is capable of lying upon and parallel with the blade, as when its use is not necessary, and which is also capable of being turned to stand at right angles to the blade, as shown by full lines in Fig. 1. A second bar F is also pivotally mounted upon the blade at a suitable fixed point which may represent the zero point or place of beginning of the scale S and which second bar may also be turned to lie parallel with the blade A or to stand at right angles thereto, as shown. These two bars E F are used together and in connection with said scale S, and their primary function is to measure the depth of the shoulder or the distance from front to rear at the shoulder. When so used, the blade A is passed under the arm and one bar F is placed against the front of the shoulder and the other bar E is placed against the back of the shoulder, the slidable bar being adjusted relative to the other bar and to the aforesaid scale to obtain the desired measurement. These bars E F may be made of thin metal, and to hold them down flat on the blade when the bars are not in use I prefer to form each bar with the enlarged head D', made square or rectangular or of such other shape that when the bars are turned to stand parallel with each other and with the blade the free end of one bar may be passed beneath the head of the other bar and the parts clamped to each other and to the blade by tightening up the suitable thumb-nuts H, which operate upon the threaded ends of the screws I, which form the pivots about which the bars are turnable. The pivot of the bar E extends through the slot D and also through one end—which may represent an enlarged head—of a flexible metal or other tape or measure J, located on the back of the blade and normally extending parallel therewith and beyond the end of the blade and adapted to measure the distance across the back and such other parts as such a tape will be found convenient. If desired, the said tape may pass through a guide or loop J' on the back of the blade to hold it flat thereon.

The two blades A and B first above described are preferably united by a hinged joint or head C, as before mentioned. This head may be made in any appropriate manner. It is shown in Fig. 3 as consisting of a substantially L-shape plate g' or reinforce on the blade A and a similarly-shaped plate h' or reinforce on the blade B, the plates overlapping and the pivot passing through the overlapping portions, and said plate g' being grooved or mortised at g'' g''', the former to receive the extending part of the plate h' and the latter to receive the edge of the blade B when the blades are folded, so that one stands at right angles to the other, the two blades then interlocking with the shoulders formed by the cut-out portions of the plates g' h' squarely in engagement, thus preserving the proper relative positions of the blades. The extreme adjacent ends of the blades are also so shaped or cut out that one will fit within the other when the blades are opened out to stand in line, thereby presenting flush surfaces. I also prefer to employ a positive means for holding the blades in either of their adjusted positions. Therefore I provide the clamping-nut L, which operates on the threaded end of the pivot about which the blades turn, and which nut is adapted when the blades stand in line and said nut is screwed down to clamp the adjacent ends of the blades tightly together in the position stated. To hold the blades when one is turned to stand at right angles to the other, I show in said Fig. 3 a stud or pin R on one of the blades and a pivoted hook member T on the other blade adapted to hook over the pin, and thus hold the blades against accidental outward movement.

The use of the device will be fully understood by those skilled in the art from the foregoing description; but it may be desirable to state further that the various geometrical scales marked upon the blades are used in connection with the ordinary tailor's tape. In other words, the measure of the part of the human form is first taken by the tailor, using the ordinary tape for obtaining the measurement, as is commonly practiced. This measure is recorded in the tailor's order-book or upon a sheet of paper, and when the time comes for cutting the garment the blades are brought into use and the particular scale or scales thereon, which are applicable to the part of the body measured, is resorted to and points are indicated upon the sheet from which the pattern is to be cut, and then the lines of the pattern are marked out, using the blades as a straight-edge for this purpose.

For instance, I will assume the measurements for a sack-coat to be as follows: breast, thirty-six inches; length of back, thirty inches; sleeve, twenty-six inches. These are all the measurements required for this coat when using my square. Having obtained these measurements and made a record of the same in the order-book or upon a sheet of paper, when I am ready to cut the paper pattern for the coat I lay my square upon the sheet of pattern-paper and draw a line along the outer edge of both blades A B. Then upon the horizontal line thus made I mark off thirty inches, representing the length of the coat, and opposite the graduation "18" of the division 3 of the scale $a$ representing the back of the armhole measurement I also make a mark, from which a line is drawn at right angles to the horizontal base-line. On the vertical line made along the outer edge of the blade B, I make a mark at the point "18" on the "half-back" scale $h$, and from this I draw a line parallel with the base-line until it intersects the line drawn from scale $a$. I now move the square upward until the outer angle of the same coincides with the line 18 for the half-back just referred to, and then I mark on the vertical line opposite the point "18" on the scale $g$ of the blade B a point representing the "half-shoulder" measurement, from which point runs a horizontal line. When the blade is in this last position, I also mark opposite the point "18" on the scale $i$ a point for the "half-chest" measure. When this is done, I again shift the square until the outer angle thereof coincides with the half-shoulder line, after which I make a mark on the vertical line at a point opposite the graduation "18" of the "half-back-of-neck" scale $f$. From each of the aforesaid points I run a horizontal line, using the blade A as a straight-edge, and after marking out the "armhole," obtaining the spring and any other required points in substantially the same manner as before pointed out, I run such diagonal and curved lines as usual and which those skilled in the art will understand, and thus shape the pattern. This pattern, it will be understood, represents one-half the garment, and from this pattern the two halves representing the full garment are readily cut.

The foregoing general description of operation applies for a sack-coat. For a Prince Albert, full-dress, or cut-away coat a similar plan is followed, using the same and such other of the scales as may be necessary to give the proper shape to the desired garment. In cutting the pattern for pantaloons I may also bring into use scale U. (Shown upon the blade A.)

Having thus described my invention, what I claim as new, and desire to secure by Letters Patent, is—

1. A tailor's measure comprising two blades pivoted together and adapted to be held in a fixed relation one at right angles to the other, one of said blades having its outer edge marked with graduations arranged in groups and representing inches and parts thereof in half-measurements for the back of the neck, for the shoulder, for the back and for the chest, said chest-measure being made duplex, and said blade having its inner edge marked with graduations arranged in groups and representing inches and fractions in half-measurements for the half-front and having other graduations representing inches and parts thereof in half-measurement for the sleeve, and for the quarter-back, the other of said blades having graduations along opposite edges representing inches and parts thereof in a one-half-back-length measure for coats of different kinds, and having separate groups of graduations for the back of armhole-measure of coats of different kinds, said blades having matching cut-out portions, and independent means for positively holding the blades when they are in line with each other or when one is arranged at right angles to the other.

2. A tailor's square, comprising a pair of blades pivotally united at their inner ends and adapted to stand one in line with the other and to be turned so that one stands at right angles to the other, means for clamping one blade to the other when said blades are in line, and separate means for holding the blades together when one is turned to stand at right angles to the other, said blades being provided along opposite edges and at intermediate points with parallel groups of graduations representing inches and proportionate parts thereof in the various half-measurements for outer garments of different styles, one of said blades provided with two pivoted bars adapted to be turned at right angles thereto, one of said bars adjustable relative to the other, and said bars adapted to measure the depth of shoulder and said blade having a scale in inches and fractions thereof over which the adjustable bar is movable.

3. A tailor's measure comprising two blades pivoted together so that they may stand in line or one may stand at right angles to the other, separate means for securing the blades in either of their adjusted positions, said blades provided with series of scales or graduations, and a pair of bars pivotally mounted upon one of the blades, one of said bars adjustable relative to the other bar and to one of said scales.

4. A tailor's measure comprising two blades one adapted to stand at right angles to the other, one of said blades longitudinally slotted, a pair of arms on said slotted blades one of said bars having a fixed pivot and the other bar having its pivot slidably mounted in the slot of the blade, said bars having enlarged head portions and capable of being turned in opposite directions so that the free end of one bar may be passed beneath the head of the other bar, and clamping-nuts for securing the bars in either the outward or folded position.

5. A tailor's measure comprising two blades adapted to be held one at right angles to the other one of said blades being longitudinally slotted, a pair of pivoted arms on the slotted blade and capable of lying parallel with the blade and at right angles thereto, one of said bars having a fixed pivot and the other bar having its pivot slidably mounted in the slot of the blade, means for fixedly securing the bars in either of their positions, and a measure on the rear of the blade and extending lengthwise thereof and fixed to and movable with the adjustable bar.

In testimony whereof I have hereunto set my hand in presence of two subscribing witnesses.

GIUSEPPE COLOSIMO.

Witnesses:
C. W. FOWLER,
T. W. FOWLER.